(12) United States Patent
Linemann et al.

(10) Patent No.: US 8,642,716 B2
(45) Date of Patent: Feb. 4, 2014

(54) BRANCHED POLYAMIDES COMPRISING UNSATURATED ENDS

(75) Inventors: Annett Linemann, Nassandres (FR); Thierry Briffaud, Caorches Saint Nicolas (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 11/113,762

(22) Filed: Apr. 25, 2005

(65) Prior Publication Data
US 2005/0245680 A1 Nov. 3, 2005

(30) Foreign Application Priority Data
Apr. 26, 2004 (FR) ...................................... 04 04382

(51) Int. Cl.
*C08G 69/02* (2006.01)
(52) U.S. Cl.
USPC ............. 528/310; 525/66; 528/312; 528/313; 528/322; 528/323; 528/331; 528/336; 528/337; 528/340; 528/347
(58) Field of Classification Search
USPC ................. 528/310, 312, 313, 322, 323, 335; 525/66
See application file for complete search history.

(56) References Cited

U.S. PATENT DOCUMENTS

| | | | | |
|---|---|---|---|---|
| 3,114,711 A | * | 12/1963 | Stuart et al. .................... | 508/376 |
| 3,470,079 A | * | 9/1969 | D' Alelio ....................... | 522/107 |
| 3,784,495 A | * | 1/1974 | Sprauer ......................... | 528/330 |
| 3,996,281 A | * | 12/1976 | Huber-Emden et al. ....... | 526/248 |
| 4,377,536 A | * | 3/1983 | Waitkus et al. ............... | 562/853 |
| 4,576,897 A | * | 3/1986 | Fujikawa et al. .......... | 430/273.1 |
| 4,595,730 A | * | 6/1986 | Blondel et al. ................ | 525/178 |
| 5,378,798 A | * | 1/1995 | Ehrlich .......................... | 427/422 |
| 5,786,086 A | * | 7/1998 | Frihart et al. .................. | 428/379 |
| 6,034,204 A | * | 3/2000 | Mohr et al. .................... | 528/328 |
| 6,680,264 B2 | | 1/2004 | Julemont | |
| 6,680,364 B1 | * | 1/2004 | Linemann ...................... | 528/310 |
| 6,867,256 B1 | | 3/2005 | Silvestro et al. | |

FOREIGN PATENT DOCUMENTS

| | | | |
|---|---|---|---|
| WO | WO 0071603 | * | 11/2000 |
| WO | WO 03/087193 | | 10/2003 |

* cited by examiner

*Primary Examiner* — Gregory Listvoyb
(74) *Attorney, Agent, or Firm* — RatnerPrestia

(57) ABSTRACT

The present invention relates to branched polyamides comprising unsaturated ends comprising:
at least one unit originating from a multifunctional monomer (A) having more than two functional groups,
at least sequences resulting from the condensation, in the presence of at least one unsaturated monoacid,
either of at least two different lactams,
or of at least one lactam, at least one dicarboxylic acid and at least one diamine,
or of a lactam or of an α,ω-aminocarboxylic acid,
or of a diamine and of a diacid.

The invention also relates to thermofusible adhesives comprising these branched polyamides comprising unsaturated ends, and to the use of these branched polyamides comprising unsaturated ends in sheathing electrical cables.

8 Claims, No Drawings

BRANCHED POLYAMIDES COMPRISING UNSATURATED ENDS

This application claims benefit, under U.S.C. §119(a) of French National Application Number 04.04382, filed Apr. 26, 2004, incorporated herein by reference.

FIELD OF THE INVENTION

The present invention relates to branched polyamides comprising unsaturated ends. They can be manufactured by copolymerization of conventional monomers which form polyamides (lactams, α,ω-aminocarboxylic acids, or diacids and diamines) in the presence of a multi-functional monomer (A) having more than 2 functional groups and with the use of an unsaturated monoacid as chain-limiting agent. The functional groups of the multifunctional monomer (A) can, for example, be of amine, acid or hydroxyl type. Mention may be made, as examples of multifunctional monomer (A), of diethylenetriamine, Jeffamine® T 403, mellitic acid, pentaerythritol and 2,2-dimethylolpropionic acid. These branched polyamides comprising unsaturated ends can be crosslinked. They can be easily crosslinked, either by heat, using peroxides as initiator, or by UV radiation (or melting under UV), using UV-sensitive initiators, or by irradiation by γ- or β-rays. They can be used as crosslinkable adhesives or for the sheathing of electrical cables and generally to produce objects having improved mechanical properties and an improved resistance to heat.

BACKGROUND OF THE INVENTION

Hot-melt adhesives are thermoplastic materials which are solid at ambient temperature and which, by heating (approximately 180° C.), become more or less viscous liquids. These liquids are applied to a first substrate and then the substrate is covered with a second surface. On cooling, adhesion between the substrate and the second surface is obtained. The open time is the period during which the adhesive which has been applied to a substrate which is at ambient temperature remains sticky, that is to say the time interval during which it is possible to apply the second surface and, on cooling, to obtain adhesion between the substrate and the second surface. Once this time limit of the open time has passed, it is no longer possible to obtain satisfactory adhesion between the substrate and the second surface. These adhesives can also be positioned in the solid state between the two materials to be adhesively bonded, then the combination is heated, the adhesive melts and, on cooling, the two materials are adhesively bonded to one another. This technique is used in the textile industry; the adhesive is in the form of a film or powder which is positioned between two fabrics and then adhesive bonding is brought about using a hot iron. These adhesives are denoted by the abbreviation HMA (hot melt adhesives) and are sometimes also denoted by the term "thermofusible adhesives".

The polyamides conventionally used as thermofusible adhesives in the textile field (fixation of wovens and nonwovens), electronic field (coating of copper wires for reels) or motor vehicle field are applied at temperatures greater than their melting points and they adhere well to various surfaces. The resistance to heat of thermofusible adhesives is therefore limited to their melting point and the product often becomes soft and adhesive already at 10° C. below its melting point. Today, a demand is observed in all fields of application for an enhancement in the performance of thermofusible adhesives, such as, for example, better adhesion to treated surfaces, better resistances to heat or better resistance of the adhesive bonding to cleaning with steam or with drycleaning solvents. This improvement in the performances must be made without changing the technology used to apply them. One means for improving the performance of an HMA is to crosslink it after adhesive bonding.

The prior art has already disclosed the crosslinking of polyamides and copolyamides. Patents DE 3725486, EP 940 461 and WO 2002/026887 disclose crosslinking by isocyanates. Patents WO 2002/086009 and U.S. Pat. No. 6,515,048 disclose crosslinking by epoxy compounds. Patent EP 326 444 discloses crosslinking by a pre-encapsulated agent. U.S. Pat. No. 6,111,030 discloses amine-terminated polyamides for crosslinking epoxy compounds, polysulphides or cyanoacrylates. The disadvantage of these systems is the necessary use of a coreactant which may be toxic, such as isocyanates, acrylates or epoxide resins. Branched copolyamides comprising unsaturated ends have now been found. The crosslinking reaction is carried out by unsaturated groups which are easy to activate by irradiation (heat, UV, UV+microwaves, β- or γ-rays). The unsaturated monoacids used as chain-limiting agents make possible the direct incorporation of the reactive principle in the polymer, which renders the product applicable without additional formulation.

The prior art has already disclosed polymers comprising unsaturated ends. Patent U.S. Pat. No. 6,680,264 discloses water-dispersible polyamides comprising unsaturated ends; these products are not HMAs. Patents EP 147 267 and WO 2003/087193 disclose linear polyamides comprising unsaturated ends. The advantage of having more than 2 unsaturated ends is that the crosslinking reaction results in the formation of a three-dimensional network, in comparison to a simple extension of the chains. The crosslinking is therefore much faster and more efficient.

SUMMARY OF THE INVENTION

The present invention relates to branched polyamides comprising unsaturated ends comprising:
  at least one unit originating from a multifunctional monomer (A) having more than two functional groups,
  at least sequences resulting from the condensation, in the presence of at least one unsaturated monoacid,
    either of at least two different lactams,
    or of at least one lactam, at least one dicarboxylic acid and at least one diamine,
    or of a lactam or of an α,ω-aminocarboxylic acid,
    or of a diamine and of a diacid,
  the proportion of (A) being under 9% by weight with respect to the combination of (A) and the above monomers.

They can be manufactured by condensation, in the presence of an unsaturated monoacid as chain-limiting agent:
  either of at least two different lactams,
  or of at least one lactam, at least one dicarboxylic acid and at least one diamine,
  or of a lactam or of an α,ω-aminocarboxylic acid,
  or of a diamine and of a diacid,
it being possible for the multifunctional monomer (A) having more than 2 functional groups to be present during the condensation of the monomers of the polyamide sequences or to be added subsequently and it being possible for a catalyst to be added.

The invention also relates to thermofusible adhesives comprising these branched polyamides comprising unsaturated ends. They can be crosslinked easily, either by heat, using peroxides as initiator, or by UV radiation (or melting under UV radiation), using UV-sensitive initiators, or by irradiation by γ- or β-rays.

The invention also relates to the use of these branched polyamides comprising unsaturated ends as thermofusible adhesives.

The invention also relates to the use of these branched polyamides comprising unsaturated ends in sheathing electrical cables.

DETAILED DESCRIPTION OF THE INVENTION

As regards the multifunctional monomer (A) having more than two functional groups, this term is used to denote any product with which either a lactam, after the opening of its ring, or a diamine or a diacid can react and to which it can be attached. Mention may be made, as examples of multifunctional monomer, of diethylenetriamine, Jeffamine® T 403, mellitic acid, pentaerythritol and 2,2-dimethylolpropionic acid. the proportion of (A) is advantageously between 0.05 and 5% by weight with respect to the combination of (A) and the above monomers. the proportion of (A) is preferably between 0.05 and 2% by weight with respect to the combination of (A) and the above monomers.

As regards the polyamide sequences, mention may be made of the copolyamides resulting from the condensation of at least two α,ω-aminocarboxylic acids (not having the same number of carbon atoms) or of two lactams (not having the same number of carbon atoms) or of a lactam and of an α,ω-aminocarboxylic acid (not having the same number of carbon atoms). Mention may also be made of the copolyamides resulting from the condensation of at least one α,ω-aminocarboxylic acid (or a lactam), at least one diamine and at least one dicarboxylic acid. Mention may also be made of the polyamides resulting from the condensation of a lactam or of an α,ω-aminocarboxylic acid or the polyamides resulting from the condensation of a diamine and of a diacid.

Mention may be made, as examples of lactams, of those having from 3 to 12 carbon atoms on the main ring and which can be substituted. Mention may be made, for example, of β,β-dimethylpropiolactam, α,α-dimethylpropiolactam, amylolactam, caprolactam, capryllactam and lauryllactam.

Mention may be made, as examples of α,ω-aminocarboxylic acid, of aminoundecanoic acid and aminododecanoic acid. Mention may be made, as examples of dicarboxylic acid, of adipic acid, sebacic acid, dodecanedioic acid, tetradecanedioic acid, isophthalic acid, butanedioic acid, 1,4-cyclohexanedicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH.

The diamine can be an aliphatic diamine having from 6 to 12 carbon atoms; it can be an aryl and/or saturated cyclic diamine. Mention may be made, by way of examples, of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, polyoldiamines, isophoronediamine (IPD), methylpentamethylenediamine (MPMD), bis(aminocyclohexyl)methane (BACM) or bis(3-methyl-4-aminocyclohexyl)methane (BMACM).

Advantageously, the copolyamide sequences comprise at least caprolactam and lauryllactam. According to another advantageous form, they comprise at least caprolactam, hexamethylenediamine and adipic acid.

Mention may be made, as examples of copolyamide sequences, of those of caprolactam and of lauryllactam (6/12), those of caprolactam, of lauryllactam and of 11-aminoundecanoic acid (6/11/12), those of caprolactam, of adipic acid and of hexamethylenediamine (6/6-6), those of caprolactam, of lauryllactam, of adipic acid and of hexamethylenediamine (6/12/6-6), those of caprolactam, of lauryllactam, of 11-aminoundecanoic acid, of azelaic acid and of hexamethylenediamine (6/6-9/11/12), those of caprolactam, of lauryllactam, of 11-aminoundecanoic acid, of adipic acid and of hexamethylenediamine (6/6-6/11/12) or those of lauryllactam, of azelaic acid and of hexamethylenediamine (PA 6-9/12).

As regards the unsaturated monoacid, mention may be made, by way of examples, of acrylic, methacrylic, cinnamic, crotonic, citraconic, itaconic, vinylacetic, undecylenic, maleic, fumaric, 5-norbornene-2-acrylic, 3-furanyl-2-acrylic, 3-pyrrolyl-2-acrylic, N-(allyl)-aminobenzoic, N-(acryloyl)aminobenzoic, N-(methacryloyl)aminobenzoic, acryloyloxybenzoic, methacryloyloxybenzoic, N-(acryloyl)-p-aminophenylacetic, N-(methacryloyl)-p-aminophenylacetic or N-allyl-11-aminoundecanoic acid. It would not be departing from the scope of the invention to use a mixture of two or more of these acids. The salts and the esters of these acids can also be used.

As regards the process for the synthesis of these copolyamides, it is the usual technique for the synthesis of polyamides or copolyamides, provided that the condensation of the monomers of the polyamide sequences is carried out in the presence of an unsaturated monoacid as chain-limiting agent. According to an advantageous form, it is recommended to add a diamine in excess to ensure that all unsaturated acid is attached to the polymer and to promote a Michael-type addition (addition of amine to double bond) as crosslinking reaction.

The multifunctional monomer (A) having more than 2 functional groups can be present during the condensation of the monomers of the polyamide sequences or can be added subsequently and a catalyst can be added. It is recommended, if the functional groups of the multifunctional monomer (A) are OH groups, to add a catalyst. This catalyst can be added at the beginning of the reaction or after the condensation of the monomers of the polyamide sequences.

This catalyst can be that which is used to condense polyamide blocks comprising carboxyl ends and diols, such as, for example, polyethylene glycols or polytetramethylene glycols. These catalysts are used in the preparation of copolymers comprising polyether blocks and polyamide blocks.

The catalyst is advantageously a derivative of a metal (M) chosen from the group formed by titanium, zirconium and hafnium.

Mention may be made, as example of derivative, of the tetraalkoxides which correspond to the general formula $M(OR)_4$, in which M represents titanium, zirconium or hafnium and the R groups, which are identical or different, denote linear or branched alkyl radicals having from 1 to 24 carbon atoms.

The $C_1$ to $C_{24}$ alkyl radicals from which are chosen the R radicals of the tetraalkoxides used as catalysts in the process according to the invention are, for example, those such as methyl, ethyl, propyl, isopropyl, butyl, ethylhexyl, decyl, dodecyl or hexadodecyl. The preferred catalysts are the tetraalkoxides in which the R radicals, which are identical or different, are $C_1$ to $C_8$ alkyl radicals. Examples of such catalysts are in particular $Zr(OC_2H_5)_4$, $Zr(O\text{-}isoC_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$ or $Hf(O\text{-}isoC_3H_7)_4$.

The catalyst used can consist solely of one or more of the tetraalkoxides of formula $M(OR_4)$ defined above. It can also be formed by the combination of one or more of these tetraalkoxides with one or more alkali metal or alkaline earth metal alcoholates of formula $(R_1O)_pY$, in which $R_1$ denotes a hydrocarbonaceous residue, advantageously a $C_1$ to $C_{24}$ and preferably $C_1$ to $C_8$ alkyl residue, Y represents an alkali metal or alkaline earth metal and p is the valency of Y. The amounts of alkali metal or alkaline earth metal alcoholate and of zirconium or hafnium tetraalkoxides which are combined in order to constitute the mixed catalyst can vary within wide limits. However, it is preferable to use amounts of alcoholate and of tetraalkoxides such that the molar proportion of alcoholate is substantially equal to the molar proportion of tetraalkoxide.

The proportion by weight of catalyst, that is to say of the tetraalkoxide or tetraalkoxides, when the catalyst does not include alkali metal or alkaline earth metal alcoholate, or else of the grouping of the tetraalkoxide or tetraalkoxides and of the alkali metal or alkaline earth metal alcoholate or alcoholates, when the catalyst is formed by the combination of these two types of compounds, advantageously varies from 0.01 to 5% of the weight of the blend of the polyamide sequences and of the multifunctional monomer (A) and is preferably between 0.05 and 2% of this weight.

Mention may also be made, as examples of other derivatives, of the salts of the metal (M), in particular the salts of (M) and of an organic acid and the complex salts between the oxide of (M) and/or the hydroxide of (M) and an organic acid. The organic acid can advantageously be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, benzoic acid, salicylic acid, phenylacetic acid, oxalic acid, malonic acid, succinic acid, glutaric acid, adipic acid, maleic acid, fumaric acid, phthalic acid and crotonic acid. Acetic acid and propionic acid are particularly preferred. M is advantageously zirconium. These salts may be known as zirconyl salts. The Applicant Company, without being bound by this explanation, believes that these salts of zirconium and of an organic acid or the complex salts mentioned above release $ZrO^{++}$ during the process. Use is made of the product sold under the name of zirconyl acetate. The amount to be used is the same as for the $M(OR)_4$ derivatives.

These catalysts are disclosed in U.S. Pat. No. 4,332,920, U.S. Pat. No. 4,230,838, U.S. Pat. No. 4,331,786, U.S. Pat. No. 4,252,920, JP 07145368A, JP 06287547A and EP 613 919.

The preparation of the polyamides is described, for example, in Kunststoff-Handbuch, 3 Technische Thermoplaste, 4 Polyamide, 1998, Carl Hanser Verlag, Munich.

The weight-average molar mass $\overline{Mw}$ is advantageously between 10 000 and 30 000 g/mol. The MFI (abbreviation for Melt Flow Index) can be between 5 and 35 g/10 min (130° C., 2.16 kg).

As regards the crosslinking, the advantage of the products of the present invention is that they are used as conventional thermofusible adhesives with the same machinery. After having adhesively bonded the materials, crosslinking is carried out. They can be easily crosslinked, either by heat, using peroxides as initiator, or by UV radiation (or melting under UV radiation), using UV-sensitive initiators, or by irradiation by γ- or β-rays.

The heat source can be infrared radiation; crosslinking takes place between 30 seconds and 5 minutes. If crosslinking is carried out under UV radiation or under UV radiation and microwaves, crosslinking takes place between 15 and 30 seconds. With regard to crosslinking under γ- or β-radiation, crosslinking takes place in less than one second.

Activation by heat does not necessitate additional capital costs. The moment and the degree of crosslinking can be controlled by the choice of the peroxide with the most appropriate activation temperature. Crosslinking by UV radiation makes it possible to separate the period for application of the product in the molten state from the period for crosslinking, although crosslinking is more effective in combination with heating the product, such as by microwaves. The advantage of the use of γ- or β-rays for crosslinking is that this is virtually instantaneous and that no initiator is necessary.

EXAMPLES

Example 1

11-Aminoundecanoic acid, caprolactam and lauryllactam are condensed in the presence of diethylenetriamine (DETA), of crotonic acid and of hexamethylenediamine.

Example 2

11-Aminoundecanoic acid, caprolactam, lauryllactam, hexamethylenediamine and adipic acid are condensed in the presence of pentaerythritol and of crotonic acid. 6 g of a mixture of zirconium acetate and of zirconium butoxide are subsequently added under an absolute pressure of 70 mbar-50 mbar and a temperature of 240° C. The reaction is halted when there is no longer a change in the viscosity.

Example 3

11-Aminoundecanoic acid, caprolactam and lauryllactam are condensed in the presence of diethylenetriamine (DETA), of undecylenic acid and of hexamethylenediamine.

Example 4

Caprolactam, adipic acid and hexamethylenediamine, and lauryllactam are condensed in the presence of diethylenetriamine (DETA) and of undecylenic acid.

The results are in Table 1.

TABLE 1

| Ex. | Composition in per cent of the weights of the starting materials | MFI in g/10 min 2.16 kg at 130° C. | Level of the gels in % (means a cross linking) with 2% peroxide treatment in a Brabender mixer | | Level of the gels in % (means a cross linking) with 4% benzophenone after UV melting (D lamp, 350-450 nm, 1100 mJ/cm$^2$) | | DMA G' at 160° C. in MPa after treatment under β-rays | |
|---|---|---|---|---|---|---|---|---|
| | | | Luperox ® 230, at 155° C. | Luperox ® 231, at 140° C. | 26 sec | 13 sec | 50 kGy | 100 kGy |
| 1 | 6/11/12 = 35/30/35 + 0.2% DETA + 1.6% crotonic acid + 1.14% HMDA | 19 | 78.8% | 80.4% | 83.90% | 32.80% | 0.18 | 0.27 |
| 2 | 6/6.6/11/12 = 30/15/10/45 + 1.37% pentaerythritol + 3.46% crotonic acid | 21.4 | 79.8% | 78.2% | 86.40% | 37.20% | 0.018 | 0.09 |

TABLE 1-continued

| Ex. | Composition in per cent of the weights of the starting materials | MFI in g/10 min 2.16 kg at 130° C. | Level of the gels in % (means a cross linking) with 2% peroxide treatment in a Brabender mixer | | Level of the gels in % (means a cross linking) with 4% benzophenone after UV melting (D lamp, 350-450 nm, 1100 mJ/cm²) | | DMA G' at 160° C. in MPa after treatment under β-rays | |
|---|---|---|---|---|---|---|---|---|
| | | | Luperox ® 230, at 155° C. | Luperox ® 231, at 140° C. | 26 sec | 13 sec | 50 kGy | 100 kGy |
| 3 | 6/11/12 = 35/30/35 + 0.2% DETA + 3.62% undecylenic acid + 1.14% HMDA | 11 | — | — | — | 67.6% | 0.64 | 1.12 |
| 4 | 6/6.6/12 = 40/25/35 + 0.2% DETA + 3.62% undecylenic acid + 1.14% HMDA | 8.8 | — | — | — | 46.3% | 0.75 | 1.05 |

Luperox ® 230 denotes n-butyl 4,4-di(tert-butylperoxy)valerate, CAS No. 995-33-5
Luperox ® 231 denotes 1,1-di(tert-butylperoxy)-3,3,5-trimethylcyclohexane, CAS No. 6731-36-8
DMA denotes dynamic mechanical analysis

What is claimed is:

1. A crosslinkable branched polyamide comprising unsaturated ends wherein the polyamide results from the condensation of 11-aminoundecanoic acid, caprolactam, lauryllactam, diethylenetriamine, undecylenic acid and hexamethylenediamine, the proportion of diethylenetriamine being from 0.05 to 2% by weight with respect to the combination of 11-aminoundecanoic acid, caprolactam, lauryllactam, diethylenetriamine, undecylenic acid and hexamethylenediamine, and wherein said hexamethylenediamine is present in excess so all undecylenic acid is attached to the polymer, wherein said polyamide has more than 2 unsaturated ends, and wherein said polyamide is both branched and crosslinkable and is suitable for use as a thermofusible adhesive.

2. A process for the manufacture of a polyamide according to claim 1, comprising condensing, in the presence of an unsaturated monoacid, wherein the unsaturated monoacid is undecylenic acid as a chain-limiting agent and allowing the direct incorporation of said unsaturated ends,
11-aminoundecanoic acid, caprolactam, lauryllactam, and hexamethylenediamine as monomers;
wherein diethylenetriamine is added either during the condensation of the monomers or subsequent to the condensation of the monomers.

3. A thermofusible adhesive comprising the crosslinkable branched polyamide comprising unsaturated ends according to claim 1.

4. The thermofusible adhesive of claim 3 comprising the sheathing of an electrical cable.

5. A crosslinkable branched polyamide comprising unsaturated ends wherein the polyamide results from the condensation of caprolactam, adipic acid, hexamethylenediamine, lauryllactam, diethylenetriamine and undecylenic acid, the proportion of diethylenetriamine being from 0.05 to 2% by weight with respect to the combination of caprolactam, adipic acid, hexamethylenediamine, lauryllactam, diethylenetriamine and undecylenic acid, and wherein said hexamethylenediamine is present in excess so all undecylenic acid is attached to the polymer, wherein said polyamide has more than 2 unsaturated ends, and wherein said polyamide is both branched and crosslinkable and is suitable for use as a thermofusible adhesive.

6. A process for the manufacture of a polyamide according to claim 5, comprising condensing, in the presence of an unsaturated monoacid, wherein the unsaturated monoacid is undecylenic acid as a chain-limiting agent and allowing the direct incorporation of said unsaturated ends, caprolactam, adipic acid, hexamethylenediamine, and lauryllactam as monomers, wherein diethylenetriamine is added either during the condensation of the monomers or subsequent to the condensation.

7. A thermofusible adhesive comprising the crosslinkable branched polyamide comprising unsaturated ends according to claim 5.

8. The thermofusible adhesive of claim 7 comprising the sheathing of an electrical cable.

* * * * *